US008852425B2

(12) United States Patent
Umansky et al.

(10) Patent No.: US 8,852,425 B2
(45) Date of Patent: Oct. 7, 2014

(54) TWO STAGE HYDROPROCESSING WITH DIVIDED WALL COLUMN FRACTIONATOR

(75) Inventors: Benjamin S. Umansky, Fairfax, VA (US); Berne K. Stober, Annandale, VA (US); Carlos N. Lopez, Amissville, VA (US); Stuart S. Shih, Gainesville, VA (US); Timothy L. Hilbert, Fairfax, VA (US); Andre T. Sims, Snellville, GA (US); William J. Tracy, III, Burk, VA (US); Akira Murata, Kanagawa (JP); Paul W. Kamienski, Oakton, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 332 days.

(21) Appl. No.: 12/946,353

(22) Filed: Nov. 15, 2010

(65) Prior Publication Data

US 2011/0132803 A1 Jun. 9, 2011

Related U.S. Application Data

(60) Provisional application No. 61/283,262, filed on Dec. 1, 2009.

(51) Int. Cl.
*C10B 57/02* (2006.01)
*C10G 51/02* (2006.01)
(Continued)

(52) U.S. Cl.
CPC ............. *C10G 45/02* (2013.01); *B01D 3/141* (2013.01); *C10G 7/00* (2013.01); *C10G 2400/04* (2013.01); *C10G 2300/304* (2013.01); *C10G 2300/1014* (2013.01); *C10G 2300/4006* (2013.01); *C10G 2300/1018* (2013.01); *C10G 2300/4012* (2013.01); *C10G 65/043* (2013.01); *C10G 2300/4018* (2013.01); *C10G 2300/202* (2013.01); *C10G 47/00* (2013.01); *C10G 65/12* (2013.01); *C10G 2300/1037* (2013.01)
USPC ............................................. 208/49; 422/610

(58) Field of Classification Search
CPC ................... C10G 2300/202; C10G 2300/301; C10G 65/12; C10G 65/02; C10G 2400/04; C10G 49/08; C10G 67/0463; C10G 47/00; C10G 49/00; C10G 51/02
USPC .............. 208/100, 57, 89, 49, 61, 58; 502/74; 585/253, 251
See application file for complete search history.

(56) References Cited

U.S. PATENT DOCUMENTS 3,412,016 A 11/1968 Graven
4,347,121 A * 8/1982 Mayer et al. .................... 208/58
(Continued)

FOREIGN PATENT DOCUMENTS

CA 2344953 10/2001
EP 819752 B1 1/1998
(Continued)

OTHER PUBLICATIONS

T. L. Hilbert, G. K. Chitnis, B. S. Umansky, P. W. Kamienski, V. Patel, A. Subramanian; "Consider new technology to produce "clean" diesel," Hydrocarbon Processing, Feb. 2008, pp. 47-56.

*Primary Examiner* — Randy Boyer
*Assistant Examiner* — Juan Valencia
(74) *Attorney, Agent, or Firm* — Chad A. Guice (57) ABSTRACT

A divided wall column allows for fractionation of multiple streams while maintaining separate product qualities. Effluents from multiple stages of a reaction system can be processed in a single divided wall column. The divided wall column can produce multiple cuts from each separated area, as well as at least one output from a common area.

19 Claims, 2 Drawing Sheets

(51) Int. Cl.
*B01D 3/14* (2006.01)
*C10G 7/00* (2006.01)
*C10G 65/04* (2006.01)
*C10G 45/02* (2006.01)
*C10G 47/00* (2006.01)
*C10G 65/12* (2006.01)

(56) References Cited

U.S. PATENT DOCUMENTS

| | | | |
|---|---|---|---|
| 5,122,257 A * | 6/1992 | Van Helden et al. | 208/49 |
| 5,464,526 A * | 11/1995 | Saunders | 208/108 |
| 5,709,780 A | 1/1998 | Ognisty et al. | |
| 5,755,933 A | 5/1998 | Ognisty et al. | |
| 6,217,749 B1 | 4/2001 | Espeillac et al. | |
| 6,261,441 B1 | 7/2001 | Gentry et al. | |
| 6,379,532 B1 | 4/2002 | Hoehn et al. | |
| 6,379,535 B1 | 4/2002 | Hoehn et al. | |
| 6,767,451 B2 | 7/2004 | Espeillac et al. | |
| 6,869,576 B2 * | 3/2005 | Espeillac et al. | 422/610 |
| 7,005,057 B1 | 2/2006 | Kalnes | |
| 7,622,034 B1 * | 11/2009 | Thakkar et al. | 208/210 |
| 2004/0204309 A1 * | 10/2004 | Pulikottil et al. | 502/60 |
| 2004/0211704 A1 | 10/2004 | Espeillac et al. | |
| 2005/0269245 A1 * | 12/2005 | Huve | 208/89 |
| 2009/0095655 A1 * | 4/2009 | Kokayeff et al. | 208/59 |
| 2009/0200201 A1 * | 8/2009 | Chen | 208/15 |

FOREIGN PATENT DOCUMENTS

| | | |
|---|---|---|
| EP | 0755707 B1 | 12/2001 |
| EP | 1149886 B1 | 9/2004 |
| WO | 2009116988 * | 9/2009 |
| WO | WO2009/116988 * | 9/2009 |
| ZA | 9711681 | 7/1998 |

* cited by examiner

TWO STAGE HYDROPROCESSING WITH DIVIDED WALL COLUMN FRACTIONATOR

This Application claims the benefit of U.S. Application No. 61/283,262, filed Dec. 1, 2009, which is hereby incorporated by reference herein in its entirety.

FIELD OF THE INVENTION

This invention provides methods for multi-stage hydroprocessing using a divided wall column as a fractionator.

BACKGROUND OF THE INVENTION

The equipment necessary for refining operations is one of the major sources of costs in a refinery. The equipment can include catalytic reactors, fractionators and/or separators, and other supporting equipment. In a conventional process train, each catalytic reactor can have a dedicated fractionator or separator associated with the reactor, to separate out the various products produced in the catalytic reaction stage.

One method for saving on capital costs is to allow more than one reactor to use the same fractionator. U.S. Pat. No. 3,412,016 shows an example of a fractionator that includes multiple volumes. In this patent, two independent refinery gasoline streams (such as a low octane and a high octane gasoline) are fractionated in the fractionator. In the fractionator, the light ends portions of the two gasoline fractions are allowed to mix. However, there is no description or suggestion of any interaction, recycling, or other mixing of the gasoline "bottoms" portions. The outputs from the fractionator are a light fraction and the two distinct heavy fractions.

European Patent Publication No. EP 0819752 appears to provide another example of using a fractionator having multiple volumes. In this publication, it appears that two separate input streams are provided to the fractionator. The vapor portions produced in each side of the fractionator are allowed to mix, leading to production of one or more light product fractions from the fractionator. Each side of the fractionator also produces a bottoms portion. In some figures, the bottom portions appear to remain separated after leaving the fractionator, while in other figures the input to the second side of the fractionator includes portions of the bottoms from both sides of the fractionator.

SUMMARY OF THE INVENTION

In a first aspect of the invention, a method for producing low sulfur distillate products is provided. The method includes hydrotreating a feedstock under first effective hydrotreating conditions. The hydrotreated feedstock can be fractionated in a first volume of a divided wall column fractionator to produce at least a first product fraction, a first bottoms fraction, and a first common fraction that is passed to an upper undivided volume of the fractionator. A portion of the first bottoms fraction can be hydroprocessed under effective hydroprocessing conditions. The hydroprocessed first bottoms fraction can then be fractionated in a second volume of the divided wall column fractionator to produce at least a second product fraction, a third product fraction, and a second common fraction that is passed to the upper undivided volume of the fractionator. In this embodiment, the second product fraction can advantageously have at least one improved property relative to the first product fraction, and the third product fraction can advantageously have at least one improved property relative to the first bottoms fraction.

In another aspect of the invention, a method for producing low sulfur distillate products is provided. The method includes hydrotreating a feedstock under effective hydrotreating conditions. The hydrotreated feedstock can be fractionated in a first volume of a divided wall column fractionator to produce at least a first diesel fraction and a first bottoms fraction. A portion of the first bottoms fraction can be dewaxed in the presence of a dewaxing catalyst under effective catalytic dewaxing conditions. The dewaxed bottoms fraction can be fractionated in a second volume of the divided wall column fractionator to produce at least a second diesel fraction and a second bottoms fraction. In this embodiment, the second diesel fraction can advantageously have at least one improved cold flow property relative to the first diesel fraction, and the second bottoms fraction can advantageously have at least one improved cold flow property relative to the first bottoms fraction.

In still another aspect of the invention, a method for producing low sulfur distillate products is provided. The method includes hydrotreating a feedstock under effective hydrotreating conditions. The feedstock can then be hydrocracked under first effective hydrocracking conditions including a temperature from about 200° C. to about 450° C., a hydrogen pressure from about 5 barg (about 0.5 MPag) to about 300 barg (about 30 MPag), an LHSV from about 0.05 $hr^{-1}$ to about 10 $hr^{-1}$, and a hydrogen treat gas rate from about two times to about fifteen times the hydrogen consumed during the hydrocracking. The hydrocracked feedstock can be fractionated in a first volume of a divided wall column fractionator to produce at least a first diesel fraction and a first bottoms fraction. A portion of the first bottoms fraction can then be hydrocracked, preferably without recycle, under second effective hydrocracking conditions. The hydrocracked bottoms fraction can be fractionated in a second volume of the divided wall column fractionator to produce at least a second diesel fraction and a second bottoms fraction. In this embodiment, the second diesel fraction can advantageously have at least one improved cold flow property relative to the first diesel fraction, and the second bottoms fraction can advantageously have at least one improved cold flow property relative to the first bottoms fraction.

DETAILED DESCRIPTION OF THE PREFERRED EMBODIMENTS

This invention provides various systems and methods for improved processing of hydrocarbon feeds. In various embodiments, the advantages of the systems and methods can include reduced equipment needs and/or reduced cost production of multiple distillate product streams from multiple reactor systems.

In one embodiment, a divided wall column is employed as a fractionator as part of a two-stage hydrotreatment and/or hydrocracking unit. In such an embodiment, the divided wall column can allow for lower cost production of diesel fuel, advantageously with a sulfur content of about 15 wppm or less, preferably about 10 wppm or less. In this type of embodiment, two hydrotreatment and/or hydrocracking reactors can be employed to share a single fractionator. The effluent from the first hydrotreatment and/or hydrocracking stage can be delivered to a first volume of the divided wall column. The effluent delivered to this first volume can be fractionated into at least two heavier fractions and one or more lighter fractions. The heavier fractions can exit the fractionator from a location below the height of the dividing wall, while the lighter fractions can exit the fractionator from the common portion of the fractionator, above the dividing wall. The at least two heavier fractions can include a bottoms fraction and a product fraction, such as a diesel fraction. At least a portion of the bottoms fraction can be sent to the second hydrotreatment and/or hydrocracking reactor. Optionally, at least a portion of the product (diesel) fraction can also be sent to the second reactor. The effluent from the second reactor can then be passed to the second volume of the divided wall column to produce at least two additional heavier fractions and one or more lighter fractions. The at least two heavier fractions from this second reactor can also include a bottoms fraction and a product fraction, such as a diesel product with a sulfur content of about 15 wppm or less, preferably about 10 wppm or less. In this type of embodiment, the separate volumes of the divided wall column can advantageously enable production of a lower sulfur (diesel) product.

In the above type of reaction system, a further improvement can be achieved by preventing any recycle of product from the bottoms and/or product (diesel) fraction(s) of the second fractionator volume. In processes involving severe hydrotreatment and/or hydrocracking of vacuum gas oil fractions, for example, one concern can include production of polynuclear aromatics (PNAs). PNA compounds involve two or more fused aromatic rings in their structures. Processes where heavy compounds can be recycled multiple times can lead to increased production of PNAs. In an embodiment, PNA production can be reduced and/or mitigated while also reducing costs by using a divided wall column as a fractionator. In this type of embodiment, at least a portion of the bottoms from the first volume of the divided wall column can be sent to the second hydrotreatment and/or hydroprocessing reactor. The effluent from this reactor can then be sent to the second volume of the fractionator. The bottoms from the second fractionator volume, however, are preferably not recycled. As a result, the heavy portions of the initial feed need not be exposed additional times to the reaction stages in the second reactor. This type of embodiment can provide the reduced cost of using a single fractionator for a multi-stage hydrocracking process while also reducing or minimizing production of PNAs.

In another type of embodiment, multiple reactors and a divided wall column can be used to produce varying grades of distillate and gas oil products at a reduced cost. In such an embodiment, the first reactor can include one or more hydrotreatment and/or hydrocracking stages, in order to provide a feed with suitable sulfur content, such as a sulfur content of about 50 wppm or less, for example about 30 wppm or less, about 15 wppm or less, or about 10 wppm or less. The effluent from this reactor can be sent to a first volume of a divided wall column for fractionation. The first volume of the fractionator can produce at least a product (diesel) fraction, a bottoms fraction, and a lighter fraction which can exit the divided wall column from a common volume. The product (diesel) fraction can be suitable for use as standard diesel fuel. At least a portion of the bottoms fraction can then be sent to a second reactor including a catalytic dewaxing stage. Optionally, a portion of the product (diesel) fraction can also be sent to the second reactor. Optionally, the second reactor can also include other stages, such as hydrotreatment, hydrocracking, and/or hydrofinishing stages. The effluent from the second reactor can be sent to the second volume of the divided wall column. When the product fraction boils in the diesel range, this can result in production of at least an arctic diesel fraction, a bottoms fraction with improved cold flow properties, and a lighter fraction that can exit the divided wall column from a common volume. In this type of embodiment, the two reactors in combination with the divided wall column can produce at least four types of distillate products. The distillate products can include a diesel product, an arctic diesel product having improved cold flow properties relative to the diesel product, a vacuum gas oil product as the bottoms from the first fractionator volume (which could optionally be suitable as an FCC feedstock), and a vacuum gas oil product with improved cold flow properties as the bottoms from the second fractionator volume (which could optionally be suitable for further processing as a lube basestock).

Divided Wall Column as a Fractionator

In various embodiments, a divided wall column can be employed as a fractionation tower. The divided wall column can contain at least three separate volumes. One of the volumes is a common volume, typically located toward the top of the divided wall column. The remaining volumes in the divided wall column can represent volumes separated from each other by a dividing wall. The various volumes are all in fluid communication with each other via the common volume. However, petroleum fractions with a sufficiently high boiling point should not be able to travel up the column to a sufficient height to reach the common volume, thus effectively fractionating the petroleum fractions by boiling point.

In various embodiments below, the divided wall column is described as having one common volume and two separated volumes. However, a divided wall column could also have three or more separated volumes, so long as there is at least one common volume shared between at least two of the separated volumes and as many as all of the separated volumes.

The volumes can be arranged in any configuration that is convenient for the desired fractionations. One option is to have each of the separated volumes occupy roughly equal portions of the divided section. For example, a divided wall column with two separated areas and one common area above could have each of the separated areas occupy roughly half of the lower portion of the divided wall column. Similarly, a divided wall column with three separated areas could have each separated area occupy approximately a third of the lower portion. Alternatively, each of the separated areas can have different volumes, which, depending on the conditions under which the divided wall column is operated, may be proportioned relative to the amounts of each volume expected.

In various embodiments, the position of the dividing wall can be any convenient position that leads to the appropriate volumes for the separated areas. For a divided wall column having a roughly rounded cylindrical shape, one option includes having a dividing wall that corresponds to a diameter of the column, which would produce two separated areas with roughly equal volumes. Another option includes having a dividing wall that corresponds to a chord connecting two points on the circumference of the rounded shape, thus leading to different volumes in each separated area. Still another option includes have a dividing wall that creates concentric circular volumes for the separated portions. While it is believed that roughly rounded cylindrical shapes are preferred for the external shell of divided wall columns, the above placements for a dividing wall can be equally applied to columns having other shapes.

In an embodiment, the dividing wall can have a height that is tall enough to allow for removal of two or more fractions from a separated volume within the column. This means that at least two fractions that do not mix with the common volume can be removed from a separated area. For example, a separated volume could be used to produce both a vacuum gas oil bottoms stream and a diesel stream that are withdrawn from the separated volume at a location below the height of the dividing wall. In one preferred embodiment, the dividing wall can have a height that is sufficient to allow for removal of two or more fractions from each of the separated volumes.

In another embodiment, the height of the dividing wall can be selected based on controlling the amount of contamination between the multiple product fractions produced by the column. For example, in a divided wall column that produces diesel fractions, the separated volumes can be used to produce two diesel fractions of different quality, such as one diesel fraction with a higher amount of sulfur and a second diesel fraction that satisfies a more stringent specification (i.e., having a lower sulfur content). In such an example, it may be desirable to limit the amount of exchange that occurs between the two diesel fractions. To limit such exchange, the height of the dividing wall can be selected to limit the amount of "contamination" between the fractions. In an embodiment, the dividing wall can have a sufficient height so that less than about 10 wt % of the product from a first separated volume corresponds from a second separated volume, for example less than about 5 wt %, less than about 1 wt %, less than about 0.1 wt %, or less than about 0.05 wt %. The amount of contamination allowed/desired can be dependent on the nature of the product. For example, if contamination can cause a product to fall outside of a government-mandated specification or other requirement, the dividing wall height can be selected to limit contamination to a more stringent level, such as less than about 0.1 wt % or less than about 0.05 wt %. Alternately, if the desire to reduce contamination is due merely to decrease in product value with a decrease in purity, the dividing wall height could be balanced against other economic considerations. In an embodiment, simulations and/or model compound experiments can be used to determine an appropriate dividing wall height.

Alternately, the height of the dividing wall can be selected based on the location of a condensing zone in the column. For a given product produced by a distillation column, the condensing zone or stage for the product can represent an upper limit for the expected height of travel for vapor of the given product. For the example of preventing contamination between diesel fractions, selecting a dividing wall height corresponding to the condensing zone for a diesel fraction would be expected to limit contamination to about 3 wt % or less, for example to about 1 wt % or less, to about 0.1 wt % or less, or to about 0.05 wt % or less.

In still another embodiment, the height of the dividing wall can be selected in relation to one or more features of the divided wall column. For example, the height of the dividing wall can be selected to correspond approximately to the height between the bottom of the column and the height of the flash zone. In another embodiment, the height of the dividing wall can correspond to the height of the bottom section of trays in the column.

In yet another embodiment, the height of the dividing wall can be at least about 15% of the height of the divided wall column, for example at least about 25% or at least about 30%. Alternatively, the height of the dividing wall can be about 75% or less of the height of the divided wall column, for example about 60% or less, about 50% or less, about 40% or less, or about 30% or less. Additionally or alternately, the height of the divided wall column can be about 75 meters or less, for example about 50 meters or less, about 35 meters or less, about 25 meters or less, or about 15 meters or less.

In embodiments where a divided wall column is replacing one or more existing fractionation columns, the diameter of a divided wall column can be selected so that the cross-sectional areas of the separate volumes roughly correspond to the cross-sectional areas of the individual fractionation columns that are being replaced. In an embodiment, the cross-sectional areas of the separate volumes can be within about 10% or less of the cross-sectional areas of the individual fractionation columns being replaced, or within about 5% or less.

In an embodiment, the interior of the divided wall column can include typical components of a fractionator. For example, a series of trays can be located in the divided wall column to assist with fractionation. Some of the trays can be located in the common volume. Other trays can be located in the separate volumes. The tray locations and/or spacing in the separate volumes can be the same or different in each volume. As an alternative to trays, any other type of internal structure typically found in a fractionator can be used, such as random packings, structured packings, grids, liquid and/or vapor distributors, liquid and/or vapor collectors, or the like, or combinations thereof. The divided wall column can also include other typical fractionator elements, such as a flash zone and/or a sump.

Feedstocks

In an embodiment, a feedstock processed in a reaction system that includes a divided wall column can be a feedstock with an initial boiling point of at least about 400° F. (about 204° C.), for example at least about 450° F. (about 232° C.), at least about 500° F. (about 260° C.), at least about 550° F. (about 288° C.), at least about 600° F. (about 316° C.), or at least about 650° F. (about 343° C.). In another embodiment, the feedstock can have a final boiling point of about 1200° F. (about 649° C.) or less, for example about 1100° F. (about 593° C.) or less, about 1050° F. (about 566° C.) or less, about 1000° F. (about 538° C.) or less, or about 900° F. (about 482° C.) or less. Alternately, the feedstock can be characterized by the boiling point required to boil a specified percentage of the feed. For example, the temperature required to boil at least 5 wt % of a feed is referred to as a "T5" boiling point. Preferably, the feedstock can have a T5 boiling point of at least about 400° F. (about 204° C.), for example at least about 450° F. (about 232° C.), at least about 500° F. (about 260° C.), at least about 550° F. (about 288° C.), at least about 600° F. (about 316° C.), at least about 650° F. (about 343° C.), or at least about 665° F. (about 352° C.). Preferably, the feedstock can have a T95 boiling point of about 1150° F. (about 621° C.) or less, for example about 1100° F. (about 593° C.) or less, about 1050° F. (about 566° C.) or less, about 1000° F. (about 538° C.) or less, about 900° F. (about 482° C.) or less, or about 850° F. (about 454° C.) or less.

The feedstock generally comprises a mineral oil. By "mineral oil" is meant a fossil/mineral fuel source, such as crude oil, and not the commercial organic product, such as sold under the CAS number 8020-83-5, e.g., by Aldrich. Examples of mineral oils can include, but are not limited to, straight run (atmospheric) gas oils, vacuum gas oils, demetallized oils, coker distillates, cat cracker distillates, heavy naphthas, diesel boiling range distillate fraction, jet fuel boiling range distillate fraction, kerosene boiling range distillate fraction, and coal liquids. The mineral oil portion of the feedstock can comprise any one of these example streams or any combination thereof. Preferably, the feedstock does not contain any appreciable asphaltenes.

The mineral oil portion of the feedstock can contain nitrogen-containing compounds (abbreviated as "nitrogen"). For example, the mineral oil can contain at least about 5 wppm nitrogen, based on total weight of the mineral oil component.

Preferably, the mineral oil will contain not greater than about 1.0 wt % nitrogen, based on total weight of the mineral oil component. In general, at least a majority of the nitrogen will be in the form of organonitrogen compounds.

The mineral oil portion of the feedstock will typically contain sulfur-containing compounds (abbreviated as "sulfur" or "sulfur content"). Such compounds can typically be present in the mineral oil at a sulfur content greater than about 100 wppm, often greater than about 500 wppm or greater than about 0.1 wt %, based on total weight of the mineral oil. Preferably, the sulfur content of the mineral oil will not be greater than about 6 wt %, preferably not greater than about 4 wt %, based on total weight of the mineral oil.

Additionally or alternately, mineral oil feedstreams suitable for use in various embodiments can have from about 50 wppm to about 6000 wppm nitrogen, preferably about 50 wppm to about 2000 wppm nitrogen or from about 75 wppm to about 1000 wppm nitrogen. Further additionally or alternately, feedstreams suitable for use herein can have from about 100 wppm to about 40,000 wppm sulfur, preferably from about 200 wppm to about 30,000 wppm sulfur or from about 350 wppm to about 25,000 wppm sulfur.

In various embodiments of the invention, the feed can additionally or alternately include feeds from biocomponent sources, such as vegetable, animal, fish, and/or algae. Generally, these biological materials include vegetable fats/oils, animal fats/oils, fish oils, pyrolysis oils, and algae lipids/oils, as well as components of such materials. More specifically, the lipid material includes one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 wt % to 40 wt % of lipids, based on total weight of the biomass itself.

Algal sources for algae oils include, but are not limited to, unicellular and multicellular algae. Examples of such algae include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans*, *Scenedesmus dimorphus*, *Euglena gracilis*, *Phaeodactylum tricornutum*, *Pleurochrysis carterae*, *Prymnesium parvum*, *Tetraselmis chui*, and *Chlamydomonas reinhardtii*.

The feedstock can include varying amounts of feedstreams based on biocomponent sources. When desired, the feed can include at least about 0.1 wt % of feed based on a biocomponent source, for example at least about 0.5 wt %, at least about 1 wt %, at least about 3 wt %, at least about 10 wt %, or at least about 15 wt %. In such embodiments, the feed can include about 60 wt % or less of biocomponent, for example about 50 wt % or less, about 40 wt % or less, or about 30 wt % or less. In other embodiments, the amount of biocomponent feed (e.g., for co-processing with the mineral oil portion of the feed) can be relatively small, for instance with a feed that includes at least about 0.5 wt % of feedstock based on a biocomponent source, e.g., at least about 1 wt %, at least about 2.5 wt %, or at least about 5 wt %. In such embodiments, the feed can include about 20 wt % or less of biocomponent based feedstock, for example about 15 wt % or less, about 10 wt % or less, or about 5 wt % or less.

The biocomponent feeds usable in the present invention can include any of those which comprise primarily triglycerides and free fatty acids (FFA). The triglycerides and FFAs typically contain aliphatic hydrocarbon chains in their structure having from 8 to 36 carbons, preferably from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, it should be understood that the fatty acid component does not necessarily contain a carboxylic acid hydrogen. In one embodiment, a majority of triglycerides present in the biocomponent feed can preferably be comprised of $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

Biocomponent based diesel boiling range feedstreams typically have relatively low nitrogen and sulfur contents. For example, a biocomponent based feedstream can contain up to about 300 wppm nitrogen, for example up to about 100 wppm nitrogen. Instead of nitrogen and/or sulfur, the primary heteroatom component in biocomponent feeds is oxygen. Biocomponent diesel boiling range feedstreams, e.g., can include as much as about 10-12 wt % oxygen.

Reaction System

A divided wall column can be employed in any reaction system that includes a fractionator. In an embodiment, one example of a suitable reaction system includes two reactors and a divided wall column. In such an embodiment, a feedstock can be passed into a first reactor. The first reactor can include one or more stages for hydrotreatment, hydrocracking, and/or another type of conversion process.

The effluent from the first reactor can then be passed to a divided wall column. The effluent can enter the divided wall column in a first separated volume. The divided wall column can fractionate the first effluent into a bottoms portion, another portion that leaves the divided wall column from the separated volume, and a lighter portion that enters a common volume in the divided wall column. In an embodiment where the bottoms portion corresponds to a feed that boils in the vacuum gas oil range, such as a bottoms portion suitable for use as a feed to a fluid catalytic cracking process, the additional portion that leaves the divided wall column from the separated volume can be a diesel fraction. More generally, the additional portion that leaves the divided wall column from the separated volume can be any distinct cut that has a lower boiling point than the bottoms but a higher boiling point than the portion that enters the common volume. Thus, the additional portion could alternatively be a diesel cut, an arctic diesel cut, a kerosene cut, a heavy naphtha cut, a light gas oil cut, or the like, depending upon the nature of the bottoms.

At least a portion of the bottoms from the first (separated) volume of the divided wall column can then be passed to a second reactor. Optionally, at least a portion of any additional cuts that exit from the first volume can also be passed to the second reactor. The second reactor can include one or more stages for performing hydrotreatment, hydrocracking, catalytic isomerization, hydrofinishing, and/or another desired type of hydroprocessing. In some embodiments, the goal of the hydroprocessing in the second reactor can be to improve at least one property of the effluent from the second reactor, such as reducing the sulfur level, improving the pour point, and/or improving the cloud point.

The effluent from the second reactor can then be passed to a second separated volume in the divided wall column for fractionation. The second volume can fractionate the effluent from the second reactor into at least a bottoms portion, optionally but preferably another portion that exits from the second volume, and a portion that enters the common volume. In an embodiment, all portions of fractionated effluents that enter the common volume can be fractionated into one or more products, such as a kerosene cut, one or more types of naphtha cuts, and/or light ends. Preferably, the bottoms cut and/or additional portion exiting from the second volume are not recycled to the first reactor, are not recycled to the second reactor, or more preferably both. These cuts can undergo further processing, however. For example, in an embodiment where the second reactor includes a catalytic isomerization stage, the bottoms cut from the second volume can include a vacuum gas oil feed suitable for further processing as a lubricant feed.

Additionally or alternately, the invention can include one or more of the following embodiments.

Embodiment 1

A method for producing low sulfur distillate products, comprising: hydrotreating a feedstock under first effective hydrotreating conditions; fractionating the hydrotreated feedstock in a first volume of a divided wall column fractionator to produce at least a first product fraction, a first bottoms fraction, and a first common fraction that is passed to an upper undivided volume of the fractionator; hydroprocessing a portion of the first bottoms fraction under effective hydroprocessing conditions; and fractionating the hydroprocessed first bottoms fraction in a second volume of the divided wall column fractionator to produce at least a second product fraction, a third product fraction, and a second common fraction that is passed to the upper undivided volume of the fractionator, wherein the second product fraction has at least one improved property relative to the first product fraction and the third product fraction has at least one improved property relative to the first bottoms fraction.

Embodiment 2

The method of embodiment 1, wherein: the hydroprocessing comprises dewaxing in the presence of a dewaxing catalyst under effective catalytic dewaxing conditions; the first product fraction is a first diesel fraction; the second product fraction is a second diesel fraction; and the third product fraction is a second bottoms fraction.

Embodiment 3

The method of embodiment 1, further comprising a hydrocracking step between the hydrotreating and fractionation steps comprising hydrocracking the hydrotreated feedstock under first effective hydrocracking conditions including a temperature from about 200° C. to about 450° C., a hydrogen pressure from about 5 barg (about 0.5 MPag) to about 300 barg (about 30 MPag), an LHSV from about 0.05 hr$^{-1}$ to about 10 hr$^{-1}$, and a hydrogen treat gas rate from about two times to about fifteen times the hydrogen consumed during the hydrocracking, and wherein: the hydroprocessing comprises hydrocracking, without recycle, under second effective hydrocracking conditions; the first product fraction is a first diesel fraction; the second product fraction is a second diesel fraction; and the third product fraction is a second bottoms fraction.

Embodiment 4

The method of any one of the previous embodiments, wherein the effective hydrotreating conditions include an LHSV from about 0.3 hr$^{-1}$ to about 5.0 hr$^{-1}$, a total pressure from about 500 psig (about 3.4 MPag) to about 3000 psig (about 20.7 MPag), and a temperature from about 650° F. (about 343° C.) to about 800° F. (about 427° C.).

Embodiment 5

The method of embodiment 4, wherein the effective hydrotreating conditions include a treat gas rate that provides an amount of hydrogen from about two times to about five times the hydrogen consumed during the hydrotreating.

Embodiment 6

The method of any one of embodiments 3-5, wherein the effective hydrocracking conditions comprise a temperature from about 200° C. to about 450° C., a hydrogen pressure from about 5 barg (about 0.5 MPag) to about 300 barg (about 30 MPag), an LHSV from about 0.05 hr$^{-1}$ to about 10 hr$^{-1}$, and a hydrogen treat gas rate from about two times to about fifteen times the hydrogen consumed during the hydrocracking.

Embodiment 7

The method of any one of the previous embodiments, wherein the sulfur content of the second product fraction is lower then the sulfur content of the first product fraction, and wherein the sulfur content of the third product fraction is lower than the sulfur content of the first bottoms fraction.

Embodiment 8

The method of any one of the previous embodiments, wherein the height of the dividing wall is selected so that the second product fraction contains about 1 wt % or less of material corresponding to the first product fraction.

Embodiment 9

The method of any one of embodiments 2 and 4-8, wherein the dewaxing catalyst comprises a 10-membered ring 1-D molecular sieve.

Embodiment 10

The method of any one of embodiments 2 and 4-9, further comprising hydrofinishing the dewaxed bottoms fraction under effective hydrofinishing conditions prior to fractionating the dewaxed bottoms, the effective hydrofinishing conditions including a temperature from about 125° C. to about 425° C., a total pressure from about 500 psig (about 3.4 MPag) to about 3000 psig (about 20.7 MPag), an LHSV from about 0.1 $hr^{-1}$ to about 5 $hr^{-1}$, and a hydrogen treat gas rate from about two times to about five times the hydrogen consumed during the hydrofinishing.

Embodiment 11

The method of any one of embodiments 2 and 4-10, wherein the effective catalytic dewaxing conditions include a temperature from about 280° C. to about 380° C., a pressure from about 300 psig (about 2.1 MPag) to about 3000 psig (about 20.7 MPag), an LHSV from about 0.1 $hr^{-1}$ to about 5.0 $hr^{-1}$, and a hydrogen treat gas rate from about two times to about fifteen times the hydrogen consumed during the dewaxing.

Embodiment 12

The method of any one of the previous embodiments, wherein one or more of the following occurs: the cloud point of the second product fraction is at least about 10° C. less than the cloud point of the first product fraction; the sulfur content of the first product fraction is about 15 wppm or less; and the pour point of the second bottoms fraction is at least about 10° C. less than the pour point of the first bottoms fraction.

Embodiment 13

The method of any one of embodiments 1-2 and 7-12, wherein the second product fraction and the second bottoms fraction are not recycled to the hydroprocessing stage.

Embodiment 14

The method of any one of embodiments 3-8 and 12, wherein the second effective hydrocracking conditions include a temperature from about 200° C. to about 450° C., a hydrogen pressure from about 5 barg (about 0.5 MPag) to about 300 barg (about 30 MPag), an LHSV from about 0.05 $hr^{-1}$ to about 10 $hr^{-1}$, and a hydrogen treat gas rate from about two times to about fifteen times the hydrogen consumed during the hydrocracking.

Embodiment 15

The method of any one of embodiments 3-8, 12, and 14, further comprising hydrotreating, dewaxing, and/or hydrofinishing the portion of the bottoms fraction either before or after hydrocracking the portion of the bottoms fraction.

EXAMPLES

Example 1

Configuration for Low Sulfur Diesel Production

Figure 1:
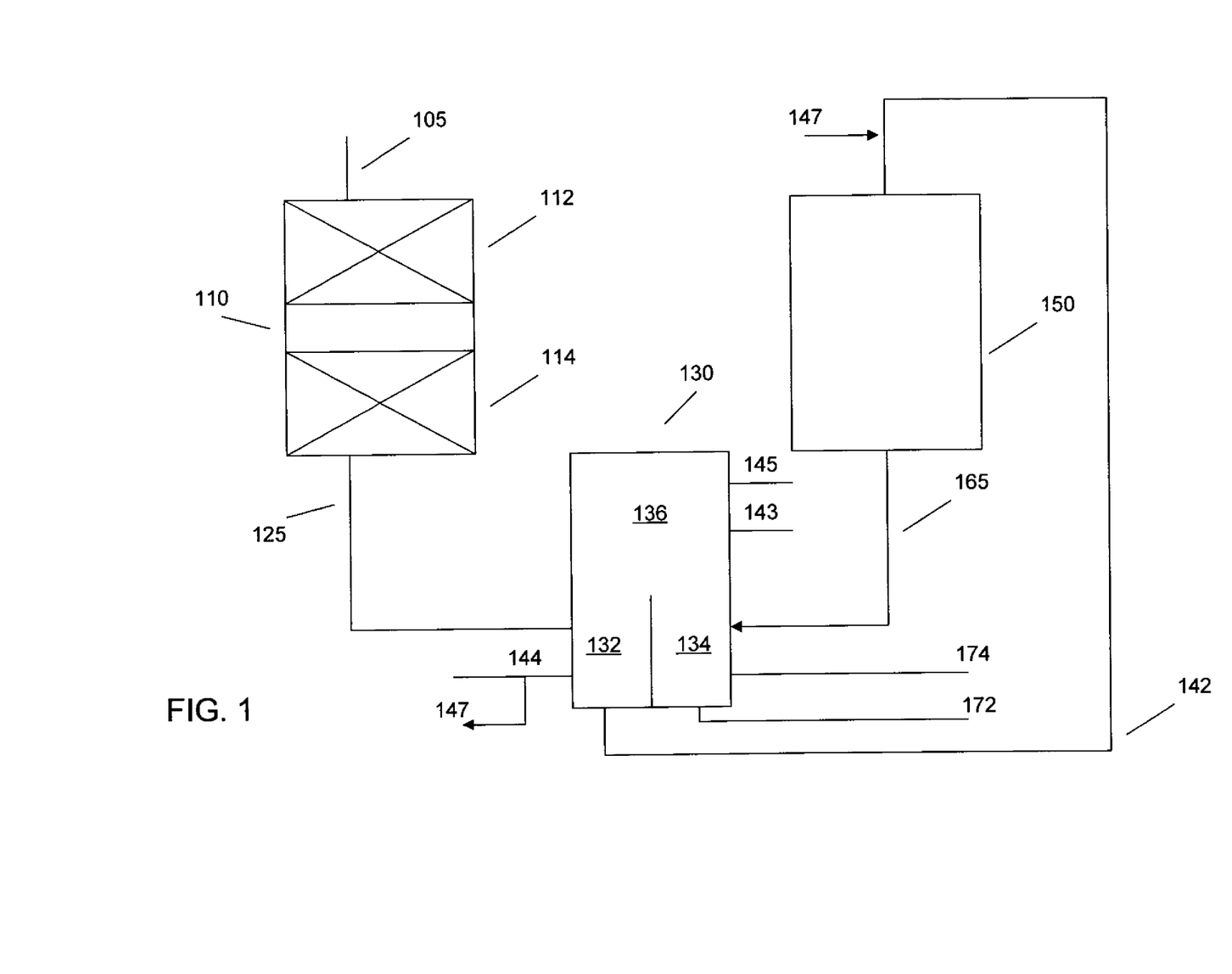
FIG. 1 schematically shows a reaction system for performing a process according to an embodiment of the invention.

In an embodiment, a divided wall column can be used as a fractionator in a two reactor reaction system for producing low sulfur diesel. FIG. 1 schematically shows an example of this type of system. In the embodiment shown in FIG. 1, reactor 110 includes one or more stages for hydrotreatment and/or hydrocracking of a feed. FIG. 1 shows a reactor 110 that includes one hydrotreatment stage 112 and one hydrocracking stage 114. However, any other convenient combination of stages can alternately be included in reactor 110. Note that, although FIG. 1 shows a reactor 110 including multiple stages, in another embodiment, multiple serial reactors can be used in place of a single reactor with multiple stages.

In a hydrotreatment stage, feed 105 is exposed to a hydrotreatment catalyst under effective hydrotreatment conditions in hydrotreatment stage 112. The catalyst in the hydrotreatment stage can be a catalyst capable of catalyzing a hydrotreating reaction, such as a conventional hydrotreating catalyst, e.g., comprising a Group VIB metal and/or a Group VIII metal on a support (for instance comprising cobalt, nickel, molybdenum, tungsten, or any combination thereof; preferred combinations of metals include nickel and molybdenum or nickel, cobalt, and molybdenum; suitable supports can include silica, silica-alumina, alumina, titania, and the like, and combinations thereof).

The reaction conditions in a hydrotreatment stage can be conditions suitable for reducing the sulfur content of the feedstream. The hydrotreatment reaction conditions can include an LHSV from about 0.3 $hr^{-1}$ to about 5.0 $hr^{-1}$, a total pressure from about 500 psig (about 3.4 MPag) to about 3000 psig (about 20.7 MPag), a temperature from about 500° F. (about 260° C.) to about 800° F. (about 427° C.), and a treat gas containing at least about 80% hydrogen (remainder inert gas). Preferably, the reaction conditions can include an LHSV from about 0.5 $hr^{-1}$ to about 1.5 $hr^{-1}$, a total pressure from about 1400 psig (about 9.7 MPag) to about 2000 psig (about 13.8 MPag), and a temperature from about 700° F. (about 371° C.) to about 750° F. (about 399° C.).

In an embodiment, the amount of treat gas delivered to the hydrotreatment stage can be based on the consumption of hydrogen in the stage. The treat gas rate for a hydrotreatment stage can be from about two to about five times the amount of hydrogen consumed per barrel of fresh feed in the stage. A typical hydrotreatment stage can consume from about 50 scf/bbl (about 8 $Nm^3/m^3$) to about 1000 scf/bbl (about 170 $Nm^3/m^3$) of hydrogen, depending on various factors including the nature of the feed being hydrotreated. Thus, the treat gas rate can be from about 100 scf/bbl (about 17 Nm$^3$/m$^3$) to about 5000 scf/bbl (about 840 Nm$^3$/m$^3$). Preferably, the treat gas rate can be from about four to about five times the amount of hydrogen consumed. Note that the above treat gas rates refer to the rate of hydrogen flow. If hydrogen is delivered as part of a stream containing gases other than hydrogen, then the treat gas rate for the overall gas stream can be proportionally higher.

The first reactor can also include one or more additional hydroprocessing stages, such as hydrocracking stage 114. Examples of hydrocracking catalysts can include nickel, nickel-cobalt-molybdenum, cobalt-molybdenum, nickel-tungsten, and/or nickel-molybdenum, with one or both of the latter two being preferred. Non-limiting examples of noble metal catalysts include those based on platinum and/or palladium. Porous support materials which may be used for both the noble and other metal catalysts can comprise a refractory oxide material such as alumina, silica, alumina-silica, kieselguhr, diatomaceous earth, magnesia, titania, zirconia, or a combination thereof, with alumina, silica, and/or alumina-silica being preferred and the most common. Zeolitic supports, especially the large pore faujasites such as USY, can additionally or alternately be used. Suitable hydrocracking conditions can include a temperature from about 200° C. to about 450° C., a hydrogen pressure from about 5 barg (about 0.5 MPag) to about 300 barg (about 30 MPag), and an LHSV from about 0.05 hr$^{-1}$ to about 10 hr$^{-1}$.

In an embodiment, the amount of treat gas delivered to the hydrocracking stage can be based on the consumption of hydrogen in the stage. The treat gas rate for a hydrotreatment stage can be from about two to about fifteen times the amount of hydrogen consumed per barrel of fresh feed in the stage. A typical hydrocracking stage can consume from about 50 scf/bbl (about 8 Nm$^3$/m$^3$) to about 1000 scf/bbl (about 170 Nm$^3$/m$^3$) of hydrogen, depending on various factors including the nature of the feed being hydrocracked. Thus, the treat gas rate can be from about 100 scf/bbl (about 17 Nm$^3$/m$^3$) to about 15000 scf/bbl (about 2500 Nm$^3$/m$^3$). Preferably, the treat gas rate can be from about four to about five times the amount of hydrogen consumed. Note that the above treat gas rates refer to the rate of hydrogen flow. If hydrogen is delivered as part of a stream containing gases other than hydrogen, the treat gas rate for the overall gas stream can be proportionally higher.

The effluent 125 from reactor 110 can then be passed to a first volume 132 of divided wall column 130. The effluent 125 can be fractionated into at least three portions. In the first volume 132, a bottoms cut 142 and a diesel cut 144/147 can be produced. Lighter portions of effluent 125 can travel up in the divided wall column to enter common volume 136. Common volume 136 can also separate out one or more cuts, for instance kerosene cut 143 and naphtha cut 145.

At least a portion of bottoms cut 142 and/or diesel cut 144/147 can then be passed to a second reactor 150. In the embodiment shown in FIG. 1, second reactor 150 includes a single hydrocracking stage. Alternately, second reactor 150 could include one or more hydrotreatment stages and/or one or more other hydroprocessing stages, such as a hydrocracking stage.

In an embodiment, the hydrotreatment and/or hydroprocessing stages in the second reactor can employ the catalysts and reaction conditions described above. Alternately, the hydrotreatment stage in reactor 150 can include a milder set of effective reaction conditions. In an embodiment, the catalyst in the hydrotreatment stage can comprise a Group VIB metal and/or a Group VIII metal, optionally on a support. Exemplary metals can include nickel, molybdenum, tungsten, and combinations thereof. Exemplary supports can include silica, silica-alumina, alumina, titania, and combinations thereof. The reaction conditions in (the hydrotreatment stage of) the second reactor can include conditions suitable for reducing the sulfur content of the feedstream, or at least of the diesel and/or gas oil portion(s) of the feedstream, to about 30 wppm or less, preferably to about 15 wppm or less or about 10 wppm or less. The reaction conditions can advantageously include an LHSV from about 0.5 hr$^{-1}$ hr to about 1.5 hr$^{-1}$, a total pressure from about 250 psig (about 1.7 MPag) to about 800 psig (about 5.5 MPag), and a temperature from about 550° F. (about 288° C.) to about 750° F. (about 399° C.), preferably an LHSV from about 0.9 hr$^{-1}$ to about 1.1 hr$^{-1}$, a total pressure from about 350 psig (about 2.4 MPag) to about 600 psig (about 4.1 MPag), and a temperature from about 625° F. (about 329° C.) to about 675° F. (about 357° C.). The treat gas rate can be selected in accordance with the procedure described above for a hydrotreatment stage.

In embodiments that include multiple hydrotreatment stages, the hydrotreatment conditions in a later stage can be less severe than the conditions in an earlier stage. For example, the pressure in a later hydrotreatment stage can be about 250 psig (1.7 MPag) less than the pressure in an earlier hydrotreatment stage, for example about 300 psig (about 2.1 MPag) less, about 600 psig (about 4.1 MPag) less, or about 900 psig (9.2 MPag) less. Additionally or alternately, the LHSV in the later hydrotreatment stage can be at least about 0.2 hr$^{-1}$ higher than the LHSV in the earlier hydrotreatment stage, for example at least about 0.5 hr$^{-1}$ higher. Further additionally or alternately, the start of run temperature in the later hydrotreatment stage can be from about 15° C. to about 30° C. less than the start of run temperature in the earlier hydrotreatment stage.

The effluent 165 from second reactor 150 can then be passed to a second volume 134 of divided wall column 130. Divided wall column 130 can fractionate effluent 165 into at least bottoms fraction 172 and optionally but preferably product (diesel) fraction 174, as well as lighter portions which can travel up to common volume 136. When product fraction 174 is a diesel fraction, bottoms fraction 172 can include unconverted vacuum gas oil that may be suitable as a feed to another process, such as a fluid catalytic cracking process. In certain situations, particularly where there is little or no product fraction 174, bottoms fraction 172 can comprise a diesel fraction. The diesel fraction can advantageously be suitable for use as a low sulfur diesel product, preferably an ultra low sulfur diesel product. In an embodiment where the diesel fraction is an ultra low sulfur diesel product, the dividing wall 135 of the divided wall column 130 can keep the relatively higher sulfur content products in first volume 132 separate from the relatively lower sulfur products in second volume 134.

It should be noted that the embodiment in FIG. 1 does not show recycling of either bottoms fraction 172 or diesel fraction 174 to second reactor 150. Instead, only streams 142 and/or 147 exiting first volume 132 are used in FIG. 1 as feed to second reactor 150. The embodiment shown in FIG. 1 thus avoids the potential for excessive recycling of bottoms portions from the fractionator. As a result, the embodiment shown in FIG. 1 can lead to reduced production of polynuclear aromatics.

In an embodiment such as FIG. 1, if desired, at least two different grades of product can be produced by each separate volume of the divided wall column. For example, the difference between a diesel fraction from the first separate volume and from the second separate volume can include a different sulfur content, a different boiling point or distillation profile, or another feature.

If the diesel fractions differ in sulfur content, the diesel fraction from the first separate volume can have a sulfur content advantageously greater than the sulfur content of the diesel fraction from the second separate volume. The sulfur content of the diesel fraction from the first separate volume can be at least about 15 wppm, for example at least about 25 wppm, at least about 50 wppm, at least about 100 wppm, or at least about 250 wppm. Additionally or alternately, the sulfur content of the diesel fraction from the first separate volume can be about 400 wppm or less, for example about 200 wppm or less, about 100 wppm or less, or about 50 wppm or less. Further additionally or alternately, the sulfur content of the diesel fraction from the second separate volume can be about 50 wppm or less, for example about 30 wppm or less, about 20 wppm or less, about 15 wppm or less, or about 10 wppm or less.

With regard to distillation profile, the separate volumes in the divided wall column can be configured to produce diesel boiling range cuts with a T5 boiling point of at least about 215° F. (about 102° C.), for example at least about 250° F. (about 121° C.), at least about 350° F. (about 177° C.), at least about 450° F. (about 232° C.), or at least about 500° F. (about 260° C.). Additionally or alternately, the separate volumes in the divided wall column can be configured to produce diesel boiling range cuts with a T95 boiling point of about 800° F. (about 427° C.) or less, for example about 700° F. (about 371° C.) or less, about 600° F. (about 316° C.) or less, about 550° F. (about 288° C.) or less, about 500° F. (about 260° C.) or less, or about 450° F. (about 232° C.) or less. Note that, if more than one diesel boiling range stream is produced in a separate volume, the above T5 and T95 values can be used to individually characterize each of the streams or to collectively characterize both of the streams.

In an embodiment, the difference in T5 boiling point for a diesel boiling range stream from the first separate volume relative to the second separate volume can be at least about 5° C., for example at least about 10° C., at least about 25° C., or at least about 50° C. Additionally or alternately, the difference in T95 boiling point for a diesel boiling range stream from the first separate volume relative to the second separate volume can be at least about 5° C., for example at least about 10° C., at least about 25° C., or at least about 50° C.

Each separate volume can also produce at least one higher boiling range stream, such as a higher boiling diesel range stream and/or a gas oil boiling range stream. The bottoms from each separate volume will typically be the higher boiling range stream, and in some embodiments multiple diesel boiling range and/or gas oil boiling range streams can be produced from each separate volume. The bottoms stream (or other additional diesel or higher boiling range streams) from each separate volume can differ based on sulfur content, distillation profile, and/or one or more other features.

Additionally or alternately, with regard to distillation profile, the separate volumes in the divided wall column can be configured to produce gas oil boiling range cuts with a T5 boiling point of at least about 550° F. (about 288° C.), for example at least about 600° F. (about 316° C.), at least about 700° F. (about 371° C.), or at least about 800° F. (about 427° C.). Additionally or alternately, the separate volumes in the divided wall column can be configured to produce gas oil boiling range cuts with a T95 boiling point of about 1100° F. (about 593° C.) or less, for example about 1000° F. (about 538° C.) or less, about 900° F. (about 482° C.) or less, or about 800° F. (about 427° C.) or less.

In an embodiment, the difference in T5 boiling point for a gas oil boiling range stream from the first separate volume relative to the second separate volume can be at least about 5° C., for example at least about 10° C., at least about 25° C., or at least about 50° C. Additionally or alternately, the difference in T95 boiling point for a gas oil boiling range stream from the first separate volume relative to the second separate volume can be at least about 5° C., for example at least about 10° C., at least about 25° C., at least about 50° C., or at least about 100° C.

One or more streams can be removed/formed from the common volume of the divided wall column, including but not limited to, a naphtha boiling range stream, a kerosene boiling range stream, a light ends stream ($C_{4-}$ hydrocarbons), or combinations thereof. Separate streams of hydrogen, hydrogen sulfide, ammonia, and/or other non-condensable gases can also be produced, or these components can leave the common volume as part of another stream, such as a light ends stream. A kerosene boiling range stream can have a T5 boiling point of at least about 200° F. (about 93° C.), for example at least about 215° F. (about 102° C.) or at least about 250° F. (about 121° C.). A kerosene boiling range stream can additionally or alternately have a T95 boiling point of about 450° F. (about 232° C.) or less, for example about 400° F. (about 204° C.) or less or about 350° F. (about 177° C.) or less. A naphtha boiling range stream can have a T5 boiling point of at least about 85° F. (about 29° C.), for example at least about 100° F. (about 38° C.) or at least about 120° F. (about 49° C.). A naphtha boiling range stream can additionally or alternately have a T95 boiling point of about 250° F. (about 121° C.) or less, for example about 215° F. (about 102° C.) or less or about 200° F. (about 93° C.) or less.

Example 2

Configuration for Production of Varying Grades of Cold Flow Properties

Figure 2:
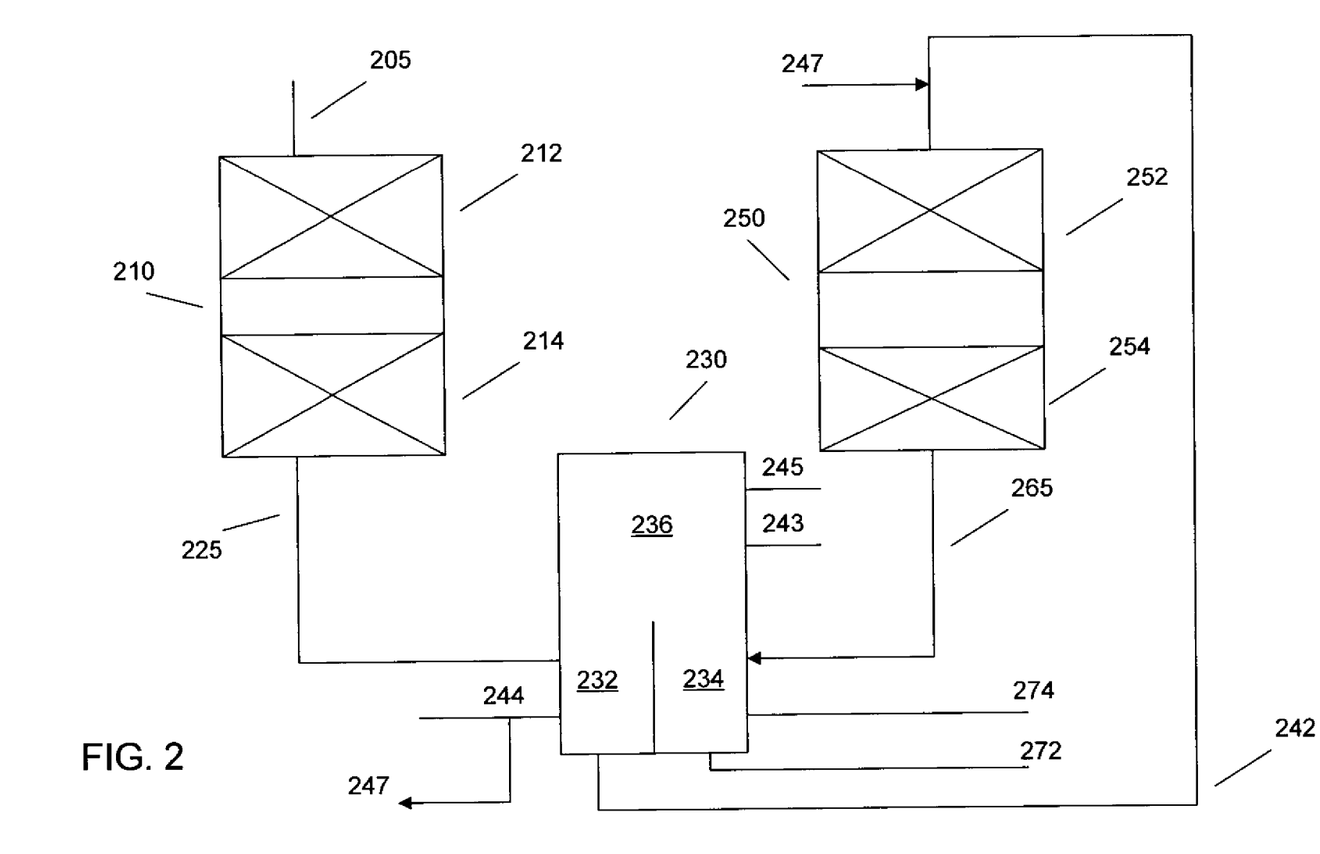
FIG. 2 schematically shows a reaction system for performing a process according to an embodiment of the invention.

In another embodiment, a divided wall column can be used as a fractionator in a two reactor reaction system for producing multiple grades of diesel as well as multiple grades of bottoms products. FIG. 2 schematically shows an example of this type of system. In the embodiment shown in FIG. 2, reactor 210 includes one or more stages for hydrotreatment and/or hydrocracking of a feed. FIG. 2 shows a reactor 210 that includes one hydrotreatment stage 212 and one hydrocracking stage 214. However, any other convenient combination of stages can alternately be included in reactor 210. Note that, although FIG. 2 shows a reactor 210 including multiple stages, in another embodiment, multiple serial reactors can be used in place of a single reactor with multiple stages.

In a hydrotreatment stage, feed 205 is exposed to a hydrotreatment catalyst under effective hydrotreatment conditions in hydrotreatment stage 212. The catalyst in the hydrotreatment stage can be a catalyst capable of catalyzing a hydrotreatment reaction, such as a conventional hydrotreating catalyst, e.g., comprising a Group VIB metal and/or a Group VIII metal on a support (for instance comprising cobalt, nickel, molybdenum, tungsten, or any combination thereof; preferred combinations of metals include nickel and molybdenum or nickel, cobalt, and molybdenum; suitable supports can include silica, silica-alumina, alumina, titania, and the like, and combinations thereof).

The reaction conditions in a hydrotreatment stage can be conditions suitable for reducing the sulfur content of the feedstream. The hydrotreatment reaction conditions can include an LHSV from about 0.3 $hr^{-1}$ to about 5.0 $hr^{-1}$, a total pressure from about 500 psig (about 3.4 MPag) to about 3000 psig (about 20.7 MPag), a temperature from about 500° F. (about 260° C.) to about 800° F. (about 427° C.), and a treat gas containing at least about 80% hydrogen (remainder inert gas). Preferably, the reaction conditions can include an LHSV from about 0.5 hr$^{-1}$ to about 1.5 hr$^{-1}$, a total pressure from about 1400 psig (about 9.7 MPag) to about 2000 psig (about 13.8 MPag), and a temperature from about 700° F. (about 371° C.) to about 750° F. (about 399° C.).

In an embodiment, the amount of treat gas delivered to the hydrotreatment stage can be based on the consumption of hydrogen in the stage. The treat gas rate for a hydrotreatment stage can be from about two to about five times the amount of hydrogen consumed per barrel of fresh feed in the stage. A typical hydrotreatment stage can consume from about 50 scf/bbl (about 8 Nm$^3$/m$^3$) to about 1000 scf/bbl (about 170 Nm$^3$/m$^3$) of hydrogen, depending on various factors including the nature of the feed being hydrotreated. Thus, the treat gas rate can be from about 100 scf/bbl (about 17 Nm$^3$/m$^3$) to about 5000 scf/bbl (about 840 Nm$^3$/m$^3$). Preferably, the treat gas rate can be from about four to about five times the amount of hydrogen consumed. Note that the above treat gas rates refer to the rate of hydrogen flow. If hydrogen is delivered as part of a stream containing gases other than hydrogen, then the treat gas rate for the overall gas stream can be proportionally higher.

The first reactor can also include one or more additional hydroprocessing stages, such as hydrocracking stage 114. Examples of hydrocracking catalysts can include nickel, nickel-cobalt-molybdenum, cobalt-molybdenum, nickel-tungsten, and/or nickel-molybdenum, with one or both of the latter two being preferred. Non-limiting examples of noble metal catalysts include those based on platinum and/or palladium. Porous support materials which may be used for both the noble and other metal catalysts can comprise a refractory oxide material such as alumina, silica, alumina-silica, kieselguhr, diatomaceous earth, magnesia, titania, zirconia, or a combination thereof, with alumina, silica, and/or alumina-silica being preferred and the most common. Zeolitic supports, especially the large pore faujasites such as USY, can additionally or alternately be used. Suitable hydrocracking conditions can include a temperature from about 200° C. to about 450° C., a hydrogen pressure from about 5 barg (about 0.5 MPag) to about 300 barg (about 30 MPag), and an LHSV from about 0.05 hr$^{-1}$ to about 10 hr$^{-1}$.

In an embodiment, the amount of treat gas delivered to the hydrocracking stage can be based on the consumption of hydrogen in the stage. The treat gas rate for a hydrotreatment stage can be from about two to about fifteen times the amount of hydrogen consumed per barrel of fresh feed in the stage. A typical hydrocracking stage can consume from about 50 scf/bbl (about 8 Nm$^3$/m$^3$) to about 1000 scf/bbl (about 170 Nm$^3$/m$^3$) of hydrogen, depending on various factors including the nature of the feed being hydrocracked. Thus, the treat gas rate can be from about 100 scf/bbl (about 17 Nm$^3$/m$^3$) to about 15000 scf/bbl (about 2500 Nm$^3$/m$^3$). Preferably, the treat gas rate can be from about four to about five times the amount of hydrogen consumed. Note that the above treat gas rates refer to the rate of hydrogen flow. If hydrogen is delivered as part of a stream containing gases other than hydrogen, the treat gas rate for the overall gas stream can be proportionally higher.

The effluent 225 from reactor 210 can then be passed to a first volume 232 of divided wall column 230. The effluent 225 can be fractionated into at least three portions. In the first volume 232, a bottoms cut 242 and a diesel cut 244/247 can be produced. Lighter portions of effluent 225 can travel up in the divided wall column to enter common volume 236. Common volume 236 can also separates out one or more cuts, for instance kerosene cut 243 and naphtha cut 245.

At least a portion of bottoms cut 242 and/or diesel cut 244/247 can then be passed to a second reactor 250. In the embodiment shown in FIG. 2, second reactor 250 includes a catalytic dewaxing stage 252 and a hydrofinishing stage 254. Alternately, second reactor 250 could include one or more other hydroprocessing stages, such as hydrotreatment, hydrocracking, catalytic dewaxing, and/or hydrofinishing stages.

In an embodiment, the catalytic dewaxing and hydrofinishing stages 252/254 in second reactor 250 can employ the catalysts and reaction conditions described above for hydrotreating and/or hydrocracking. Alternately, the catalytic dewaxing and hydrofinishing stages in second reactor 250 can include a milder set of effective reaction conditions. The reaction conditions in (the catalytic dewaxing and hydrofinishing stages of) the second reactor can include conditions suitable for reducing the sulfur content of the feedstream, or at least of the diesel and/or gas oil portion(s) of the feedstream, to about 30 wppm or less, preferably to about 15 wppm or less or about 10 wppm or less. The reaction conditions can advantageously include an LHSV from about 0.5 hr$^{-1}$ to about 1.5 hr$^{-1}$, a total pressure from about 250 psig (about 1.7 MPag) to about 800 psig (about 5.5 MPag), and a temperature from about 550° F. (about 288° C.) to about 700° F. (about 399° C.), preferably an LHSV from about 0.9 hr$^{-1}$ to about 1.1 hr$^{-1}$, a total pressure from about 350 psig (about 2.4 MPag) to about 600 psig (about 4.1 MPag), and a temperature from about 625° F. (about 329° C.) to about 675° F. (about 357° C.). The treat gas rate can be selected in accordance with the procedure described above for a hydrotreatment stage.

In embodiments that include multiple hydroprocessing stages, the hydroprocessing conditions in a later stage can be less severe than the conditions in an earlier stage. For example, the pressure in a later hydroprocessing stage can be about 250 psig (1.7 MPag) less than the pressure in an earlier hydroprocessing/hydrotreatment stage, for example about 300 psig (about 2.1 MPag) less, about 600 psig (about 4.1 MPag) less, or about 900 psig (9.2 MPag) less. Additionally or alternately, the LHSV in the later hydroprocessing stage can be at least about 0.2 hr$^{-1}$ higher than the LHSV in the earlier hydroprocessing/hydrotreatment stage, for example at least about 0.5 hr$^{-1}$ higher. Further additionally or alternately, the start of run temperature in the later hydroprocessing stage can be from about 15° C. to about 30° C. less than the start of run temperature in the earlier hydroprocessing/hydrotreatment stage.

In a catalytic dewaxing stage, such as stage 252, feed 242/247 can be exposed to a catalytic dewaxing catalyst under catalytic dewaxing conditions. Generally, catalytic dewaxing can be accomplished by selective hydrocracking and/or by hydroisomerizing long chain molecules within a feed such as a diesel and/or gas oil boiling range feed. Exemplary dewaxing catalysts can include, but are not limited to, molecular sieves such as crystalline aluminosilicates (zeolites) or silicoaluminophosphates (SAPOs). These catalysts may also carry a metal hydrogenation component, if present preferably comprising a Group VIII metal, especially a Group VIII noble metal. Dewaxing conditions can include a temperature from about 280° C. to about 380° C., a pressure from about 300 psig (about 2.1 MPag) to about 3000 psig (about 20.7 MPag), and an LHSV from about 0.1 hr$^{-1}$ to about 5.0 hr$^{-1}$.

In an embodiment, the amount of treat gas delivered to the dewaxing stage can be based on the consumption of hydrogen in the stage. The treat gas rate for a dewaxing stage can be from about two to about fifteen times the amount of hydrogen consumed per barrel of fresh feed in the stage. A typical catalytic dewaxing stage can consume from about 50 scf/bbl (about 8 Nm³/m³) to about 200 scf/bbl (about 34 Nm³/m³) of hydrogen, depending on various factors including the nature of the feed being dewaxed. Thus, the treat gas rate can be from about 100 scf/bbl (about 17 Nm³/m³) to about 3000 scf/bbl (about 500 Nm³/m³). Preferably, the treat gas rate can be from about four to about five times the amount of hydrogen consumed. Note that the above treat gas rates refer to the rate of hydrogen flow. If hydrogen is delivered as part of a stream containing gases other than hydrogen, the treat gas rate for the overall gas stream can be proportionally higher.

In various embodiments, the molecular sieve used for catalytic dewaxing can comprise or be a 10-membered ring 1-D molecular sieve, such as ZSM-48. Such sieves can perform dewaxing primarily by isomerizing molecules within the feed. Typical silica to alumina ratios for ZSM-48 can be about 250:1 or less, or about 200:1 or less. Preferably, the silica to alumina ratio of the ZSM-48 can be less than about 110:1. To form a catalyst, the ZSM-48 can be composited with a binder, including but not limited to, silica, alumina, silica-alumina, titania, zirconia, or a mixture thereof. Additionally or alternately, other suitable binders will be apparent to those of skill in the art.

In the embodiment shown in FIG. 2, the output from catalytic dewaxing stage 252 can then be passed to hydrofinishing stage 254. Examples of hydrofinishing catalysts can include, but are not limited to, catalysts containing Group VIS and/or Group VIII metals. In an embodiment, at least one metal can be sulfided to impart a strong hydrogenation function. Additionally or alternately, the hydrofinishing catalyst can include a Group VIII noble metal, such as Pt, Pd, or a combination thereof. In one embodiment, the metal(s) may be present in bulk (e.g., as a bulk metal catalyst), in an amount of about 30 wt % or greater, preferably of about 50 wt % or greater, based on the weight of the catalyst. Alternately, the metal(s) may be supported on amorphous or crystalline oxide materials, which can include, but are not limited to, low acidic oxides such as silica, alumina, silica-alumina, titania, or the like, or combinations thereof (preferably comprising at least alumina). The support may additionally be modified, such as by halogenation, particularly fluorination. The metal content of the supported catalyst can be as high as about 25 wt %, usually about 20 wt % or less, for non-noble metals. In an embodiment, a preferred hydrofinishing catalyst can include a crystalline material belonging to the M41S class/family of catalysts, which are mesoporous materials having relatively high silica content. Examples of the M41S class/family of catalysts include MCM-41 (preferred), MCM-48, and MCM-50.

Hydrofinishing conditions can include a temperature from about 125° C. to about 425° C., preferably about 180° C. to about 280° C., a total pressure from about 500 psig (about 3.4 MPag) to about 3000 psig (about 20.7 MPag), preferably from about 1500 psig (about 10.3 MPag) to about 2500 psig (about 17.2 MPag), and an LHSV from about 0.1 hr⁻¹ to about 5 hr⁻¹, preferably about 0.5 hr⁻¹ to about 1.5 hr⁻¹. The treat gas rate can be selected in accordance with the procedure described above for a hydrotreatment stage.

The effluent 265 from second reactor 250 can then be passed to a second volume 234 of divided wall column 230. Divided wall column 230 can fractionate effluent 265 into at least bottoms fraction 272, optionally but preferably product (arctic diesel) fraction 274, and lighter portions which can travel up to common volume 236. When product fraction 274 is an arctic diesel fraction, bottoms fraction 272 can include dewaxed vacuum gas oil that may be suitable as a feed to another process, such as a feed for production of lubricant base stocks. The arctic diesel fraction can be suitable for use as a diesel fuel, preferably in low temperature environments. Alternately, portions of the arctic diesel fraction can be blended with portions of diesel fraction 244 from the first reactor.

In an embodiment such as FIG. 2, if desired, at least two different grades of product can be produced by each separate volume of the divided wall column. For example, the difference between a diesel fraction a from the first separate volume and the product fraction from the second separate volume can include a different sulfur content for the products, a different boiling point range and/or distillation profile, or other feature such as a cold flow property of the fraction. Potential differences between sulfur contents and distillation profiles are described above. With regard to other features such as cold flow properties, the diesel/gas oil fraction from the first separate volume can differ from the diesel/gas oil fraction from the second separate volume in cloud point, in pour point, and/or in another cold flow property.

In an embodiment, the cloud point of the diesel/gas oil fraction from the second separate volume can be at least about 5° C. less than the cloud point of the diesel/gas oil fraction from the first separate volume, for example at least about 10° C. less, at least about 15° C. less, or at least about 25° C. less. Additionally or alternately, the pour point of the diesel/gas oil fraction from the second separate volume can be at least about 5° C. less than the pour point of the diesel/gas oil fraction from the first separate volume, for example at least about 10° C. less, at least about 15° C. less, or at least about 25° C. less.

Example 3

Example of Divided Wall Column

Based on simulations, the following divided wall column is predicted to be suitable for various embodiments of the invention. In this embodiment, a divided wall column having a height of about 35 meters was simulated. Table 1 provides further information regarding the details of the divided wall column.

TABLE 1

| Section | Tray numbers | Tray passes | Tray spacing (mm) | Tray effic. | Section height (m) |
| --- | --- | --- | --- | --- | --- |
| 1 | 2-6 | 1 | ~610 | ~75% | ~4.3 |
| 2 | 7-18 | 2 | ~510 | ~65% | ~9.4 |
| 3 | 19-26 | 2 | ~840 | ~65% | ~10.3 |
| Flash zone | | | | | ~3.0 |
| 4 | 27-30 | 2 | ~610 | ~50% | ~4.9 |
| Sump | | | | | ~3.0 |

The divided wall column described in Table 1 was simulated for fractionation of the output of a configuration similar to the reactors shown in Example 2. The dividing wall for the column in Table 1 can be at least as tall as about the height of the sump plus zone 4, and less than about the total height of the sump, section 4, and the flash zone. Thus, for the dividing wall column shown in Table 1, the dividing wall can be from about 7.9 m to about 10.9 m. Alternately, the height of the dividing wall can be selected so that any contamination between fractions produced in different separate volumes is below a desired level.

In the simulations for the divided wall column, the dividing wall resulted in two different sized non-common volumes. The first separate volume, corresponding to the separate volume for the hydrotreating/hydrocracking product, represented about 59% of the total volume. The two separate volumes for the divided wall column were selected to have volumes that were roughly similar to individual fractionation columns suitable for the same separation.

The divided wall column described in Table 1 allowed for fractionation of two distinct products from each of the separate areas below the height of the dividing wall. For an initial vacuum gas oil feed, the separate products included a bottoms product and a diesel boiling range product for each separate area. The bottoms product and diesel boiling range product from the second separate volume of the divided wall column corresponded to products with improved cold flow properties relative to the products from the first separate volume.

What is claimed is:

1. A method for producing low sulfur distillate products, comprising:
hydrotreating a feedstock under first effective hydrotreating conditions to produce a hydrotreated feedstock that comprises a diesel product fraction having a sulfur content of about 15 wppm to about 50 wppm;
fractionating the hydrotreated feedstock in a first volume of a divided wall column fractionator to produce at least a first diesel product fraction, a first bottoms fraction, and a first common fraction that is passed to an upper undivided volume of the fractionator;
hydroprocessing a portion of the first bottoms fraction under effective hydroprocessing conditions; and
fractionating the hydroprocessed first bottoms fraction in a second volume of the divided wall column fractionator to produce at least a second diesel product fraction with at least one improved property relative to the first diesel product fraction, a third product fraction with at least one improved property relative to the first bottoms fraction, and a second common fraction that is passed to the upper undivided volume of the fractionator,
in which the second diesel fraction and the third fraction are not recycled to the hydroprocessing.

2. The method of claim 1, wherein the effective hydrotreating conditions include an LHSV from about 0.3 hr-1 to about 5.0 hr-1, a total pressure from about 500 psig (about 3.4 MPag) to about 3000 psig (about 20.7 MPag), and a temperature from about 650° F. (about 343° C.) to about 800° F. (about 427° C.).

3. The method of claim 2, wherein the effective hydrotreating conditions include a treat gas rate that provides an amount of hydrogen from about two times to about five times the hydrogen consumed during the hydrotreating.

4. The method of claim 1, further comprising hydrocracking the hydrotreated feed under effective hydrocracking conditions prior to passing the hydrotreated feed to the first volume of the divided wall column, the effective hydrocracking conditions comprising a temperature from about 200° C. to about 450° C., a hydrogen pressure from about 5 barg (about 0.5 MPag) to about 300 barg (about 30 MPag), an LHSV from about 0.05 hr-1 to about 10 hr-1, and a hydrogen treat gas rate from about two times to about fifteen times the hydrogen consumed during the hydrocracking.

5. The method of claim 1, wherein the effective hydroprocessing conditions comprise effective hydrocracking conditions.

6. The method of claim 1, wherein the sulfur content of the second product diesel fraction is lower than the sulfur content of the first diesel product fraction, and wherein the sulfur content of the third product fraction is lower than the sulfur content of the first bottoms fraction.

7. The method of claim 1, wherein the height of the dividing wall is selected so that the second diesel product fraction contains about 1 wt % or less of material corresponding to the first diesel product fraction.

8. A method for producing low sulfur distillate products, comprising:
hydrotreating a feedstock under effective hydrotreating conditions to produce a hydrotreated feedstock having a sulfur content of about 50 wppm or less;
fractionating the hydrotreated feedstock in a first volume of a divided wall column fractionator to produce at least a first diesel fraction and a first bottoms fraction;
dewaxing a portion of the first bottoms fraction in the presence of a dewaxing catalyst under effective catalytic dewaxing conditions;
and fractionating the dewaxed bottoms fraction in a second volume of the divided wall column fractionator to produce at least a second diesel fraction with at least one improved cold flow property relative to the first diesel fraction and a second bottoms fraction with at least one improved cold flow property relative to the first bottoms fraction;
in which the second diesel fraction and the second bottoms fraction are not recycled to the dewaxing stage.

9. The method of claim 8, wherein the dewaxing catalyst comprises a 10-membered ring 1-D molecular sieve.

10. The method of claim 8, further comprising hydrofinishing the dewaxed bottoms fraction under effective hydrofinishing conditions prior to fractionating the dewaxed bottoms, the effective hydrofinishing conditions including a temperature from about 125° C. to about 425° C., a total pressure from about 500 psig (about 3.4 MPag) to about 3000 psig (about 20.7 MPag), an LHSV from about 0.1 hr-1 to about 5 hr-1, and a hydrogen treat gas rate from about two times to about five times the hydrogen consumed during the hydrofinishing.

11. The method of claim 8, wherein the effective catalytic dewaxing conditions include a temperature from about 280° C. to about 380° C., a pressure from about 300 psig (about 2.1 MPag) to about 3000 psig (about 20.7 MPag), an LHSV from about 0.1 hr-1 to about 5.0 hr-1, and a hydrogen treat gas rate from about two times to about fifteen times the hydrogen consumed during the dewaxing.

12. The method of claim 8, wherein the cloud point of the second diesel fraction is at least about 10° C. less than the cloud point of the first diesel fraction.

13. The method of claim 8, wherein the sulfur content of the first diesel fraction is at least about 25-wppm.

14. The method of claim 8, wherein the pour point of the second bottoms fraction is at least about 10° C. less than the pour point of the first bottoms fraction.

15. The method of claim 8, wherein the effective hydrotreating conditions include an LHSV from about 0.3 hr-1 to 5.0 hr-1, a total pressure from about 500 psig (about 3.4 MPag) to about 3000 psig (about 20.7 MPag), a temperature from about 650° F. (about 343° C.) to about 800° F. (about 427° C.), and a hydrogen treat gas rate from about two times to about five times the hydrogen consumed during the hydrotreating.

16. A method for producing low sulfur distillate products, comprising:
hydrotreating a feedstock under effective hydrotreating conditions;
hydrocracking the hydrotreated feedstock under first effective hydrocracking conditions including a temperature from about 200° C. to about 450° C., a hydrogen pressure from about 5 barg (about 0.5 MPag to about 300 barg (about 30 MPag), an LHSV from about 0.05 hr-1 to about 10 hr-1, and a hydrogen treat gas rate from about two times to about fifteen times the hydrogen consumed during the hydrocracking;

fractionating the hydrocracked feedstock in a first volume of a divided wall column fractionator to produce at least a first diesel fraction and a first bottoms fraction;

hydrocracking, without recycle, a portion of the first bottoms fraction, under effective hydrocracking conditions; and fractionating the hydrocracked first bottoms fraction in a second volume of the divided wall column fractionator to produce at least a second diesel fraction and a second bottoms fraction, wherein the second diesel fraction has at least one improved cold flow property relative to the first diesel fraction, and wherein the second bottoms fraction has at least one improved cold flow property relative to the first bottoms fraction and the second diesel fraction and the second bottoms fraction are not recycled to the first or second hydrocracking step.

17. The method of claim 16, wherein the second effective hydrocracking conditions include a temperature from about 200° C. to about 450° C., a hydrogen pressure from about 5 barg [about 0.5 MPag] to about 300 barg [about 30 MPag], an LHSV from about 0.05 hr-1 to about 10 hr-1, and a hydrogen treat gas rate from about two times to about fifteen times the hydrogen consumed during the hydrocracking.

18. The method of claim 16, further comprising hydroprocessing the portion of the bottoms fraction either before or after hydrocracking the portion of the bottoms fraction, wherein the hydroprocessing consists essentially of hydrotreating, dewaxing, and/or hydrofinishing the portion of the bottoms fraction.

19. The method of claim 13 in which the sulfur content of the second diesel fraction is about 15 wppm or less.

* * * * *